United States Patent
Chang

(10) Patent No.: US 7,469,790 B2
(45) Date of Patent: Dec. 30, 2008

(54) OIL EXTRACTING APPARATUS

(76) Inventor: Chin Lun Chang, No. 16-7, Kou-Tsao Lane, Yuan-Lin Chen, Changhua Hsien (TW)

( * ) Notice: Subject to any disclaimer, the term of this patent is extended or adjusted under 35 U.S.C. 154(b) by 4 days.

(21) Appl. No.: 11/730,122

(22) Filed: Mar. 29, 2007

(65) Prior Publication Data

US 2008/0237114 A1 Oct. 2, 2008

(51) Int. Cl.
*C02F 1/40* (2006.01)
(52) U.S. Cl. .................. 210/526; 210/540; 210/923
(58) Field of Classification Search ............ 210/242.3, 210/523, 526, 540, 776, 923
See application file for complete search history.

(56) References Cited

U.S. PATENT DOCUMENTS

| | | | | |
|---|---|---|---|---|
| 3,358,838 A | * | 12/1967 | Kosar et al. .................. 210/523 |
| 5,522,990 A | * | 6/1996 | Davidian .................. 210/242.3 |
| 5,618,420 A | * | 4/1997 | Stella .................. 210/242.3 |
| 5,681,458 A | * | 10/1997 | Favret .................. 210/776 |
| 5,685,979 A | * | 11/1997 | Governale .................. 210/242.3 |
| 6,261,451 B1 | * | 7/2001 | Genevrino .................. 210/242.3 |
| 6,471,862 B1 | * | 10/2002 | Rockwell .................. 210/242.3 |
| 6,962,659 B2 | * | 11/2005 | Rhein et al. .................. 210/242.3 |
| 7,296,694 B2 | * | 11/2007 | Weymouth .................. 210/526 |

* cited by examiner

*Primary Examiner*—Christopher Upton
(74) *Attorney, Agent, or Firm*—Steptoe & Johnson LLP

(57) ABSTRACT

An oil extracting apparatus includes a rigid oil adhering ring having a horizontally disposed ring axis and an oil adhering surface surrounding the ring axis, a driving device coupled to the oil adhering ring for driving rotation of the oil adhering ring about the ring axis, an oil scraping unit, and an oil collecting unit. At least a portion of the oil adhering ring below the ring axis is adapted to be immersed in a water body. Rotation of the oil adhering ring results in separation of the oil from the water body and in adhering of the oil on the oil adhering ring to form an oil film on the oil adhering surface of the oil adhering ring. The oil scraping unit scrapes the oil film from the oil adhering surface of the oil adhering ring. The oil collecting unit collects the oil scraped by the oil scraping unit.

5 Claims, 5 Drawing Sheets

OIL EXTRACTING APPARATUS

BACKGROUND OF THE INVENTION

1. Field of the Invention

The invention relates to an apparatus for processing wastewater, more particularly to an oil extracting apparatus for removing oil from a water body.

2. Description of the Related Art

As shown in FIG. 1, a conventional oil extracting apparatus 10 includes a drive shaft 11 and a flexible steel belt 12 having a portion immersed in a water body 100. When the steel belt 12 is driven by the drive shaft 11 to turn, oil in the water body 100 will be separated from the water body 100 and adhere to the steel belt 12. The conventional oil extracting apparatus 10 further includes a plurality of oil scraping plates 13 for scraping the oil that adhered to the steel belt 12. After being scraped from the steel belt 12, the oil will be collected for subsequent processing. However, the conventional oil extracting apparatus 10 is only suitable for extracting oil from a relatively deep water body, thereby limiting practical applications of the same.

As shown in FIGS. 2 and 3, another conventional oil extracting apparatus 20 includes a drive shaft 21 and a round plate 22 having a portion immersed in another water body 200. When the round plate 22 is driven by the drive shaft 21 to rotate, oil in the water body 200 will be separated from the water body 200 and will adhere to the round plate 22. The conventional oil extracting apparatus 20 further includes an oil collector 23 and a plurality of oil scraping plates 231 for scraping the oil that adhered to the round plate 22. After being scraped from the round plate 22, the oil will be collected in the oil collector 23. However, since the oil scraping plates 231 apply lateral thrust forces to the round plate 22 while scraping the oil from the round plate 22, moments and torques about the drive shaft 21 are relatively large. The lateral thrust forces may result in damage to the drive shaft 21 after long-term use, thereby increasing the cost of maintenance. In addition, since the drive shaft 21 is located at the center of the round plate 22, the round plate 22 can only be immersed in a water body 200 where the distance between the water level and the drive shaft 21 is shorter than the radius of the round plate 22. When the distance between a water level and the drive shaft 21 is longer than the radius of the round plate 22, the round plate 22 has to be made larger, thereby resulting in a higher moment and torque of force, and in higher manufacturing and maintenance costs.

SUMMARY OF THE INVENTION

Therefore, the object of the present invention is to provide a practical and durable oil extracting apparatus with a smaller size and lower manufacturing and maintenance costs.

Accordingly, an oil extracting apparatus of the present invention comprises a rigid oil adhering ring having a horizontally disposed ring axis and an oil adhering surface surrounding the ring axis, a driving device coupled to the oil adhering ring for driving rotation of the oil adhering ring about the ring axis, an oil scraping unit, and an oil collecting unit. At least a portion of the oil adhering ring below the ring axis is adapted to be immersed in a water body. Rotation of the oil adhering ring results in separation of the oil from the water body and in adhering of the oil on the oil adhering ring to form an oil film on the oil adhering surface of the oil adhering ring. The oil scraping unit scrapes the oil film from the oil adhering surface of the oil adhering ring. The oil collecting unit collects the oil scraped by the oil scraping unit from the oil adhering surface of the oil adhering ring.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
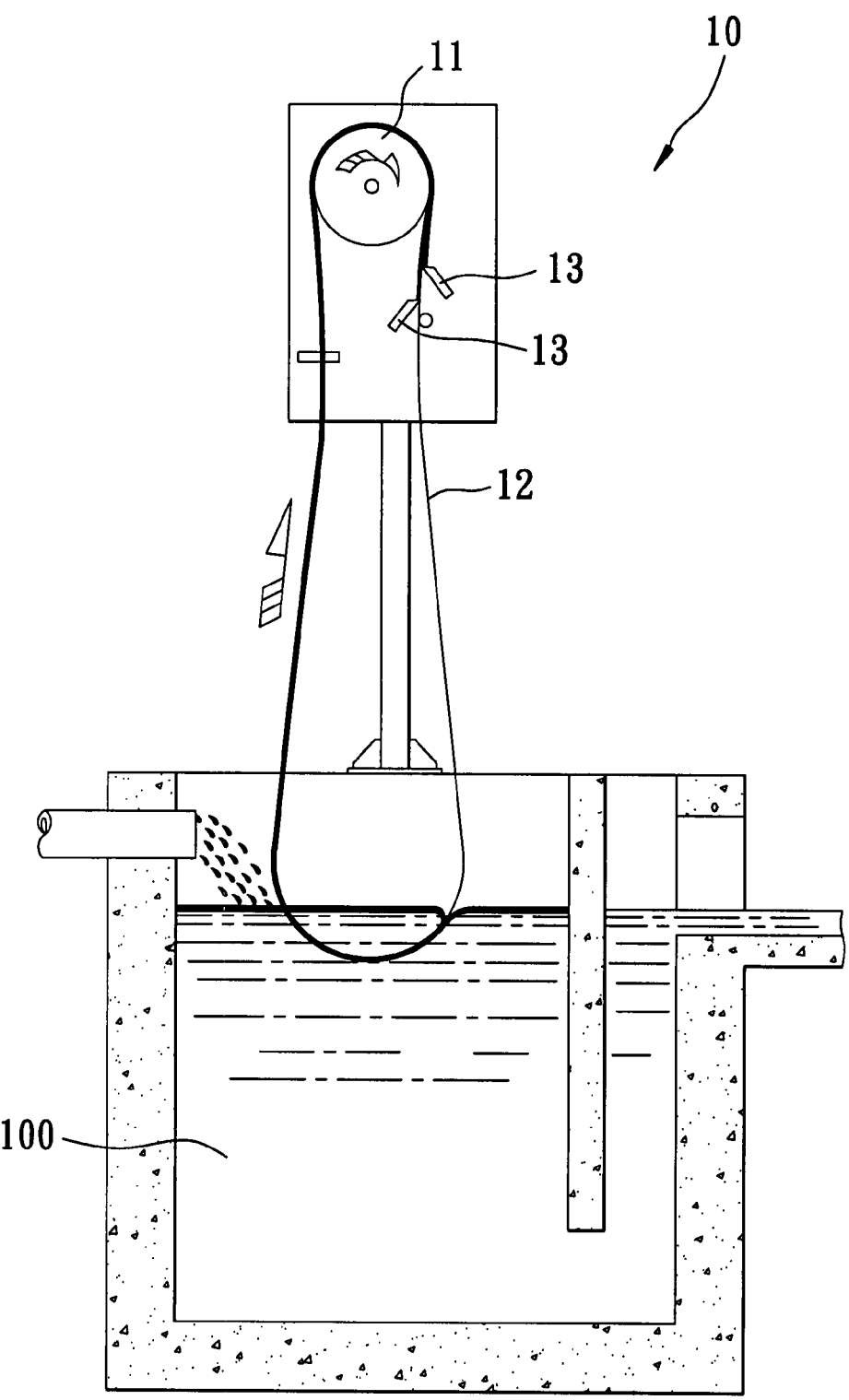
FIG. 1 is a schematic view of a conventional oil extracting apparatus with a flexible steel belt.
Figure 2:
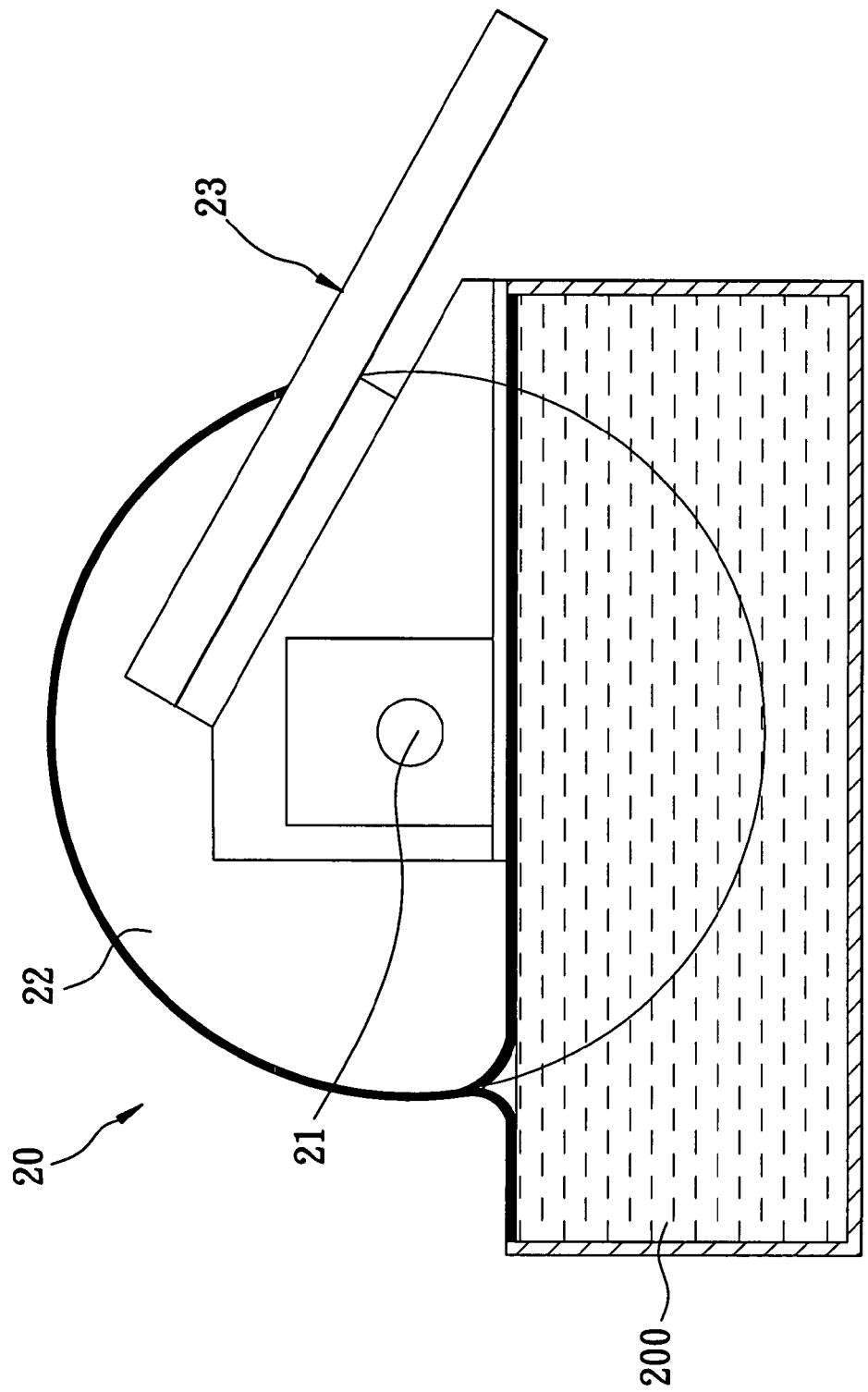
FIG. 2 is a schematic view of a conventional oil extracting apparatus with a round plate.
Figure 3:
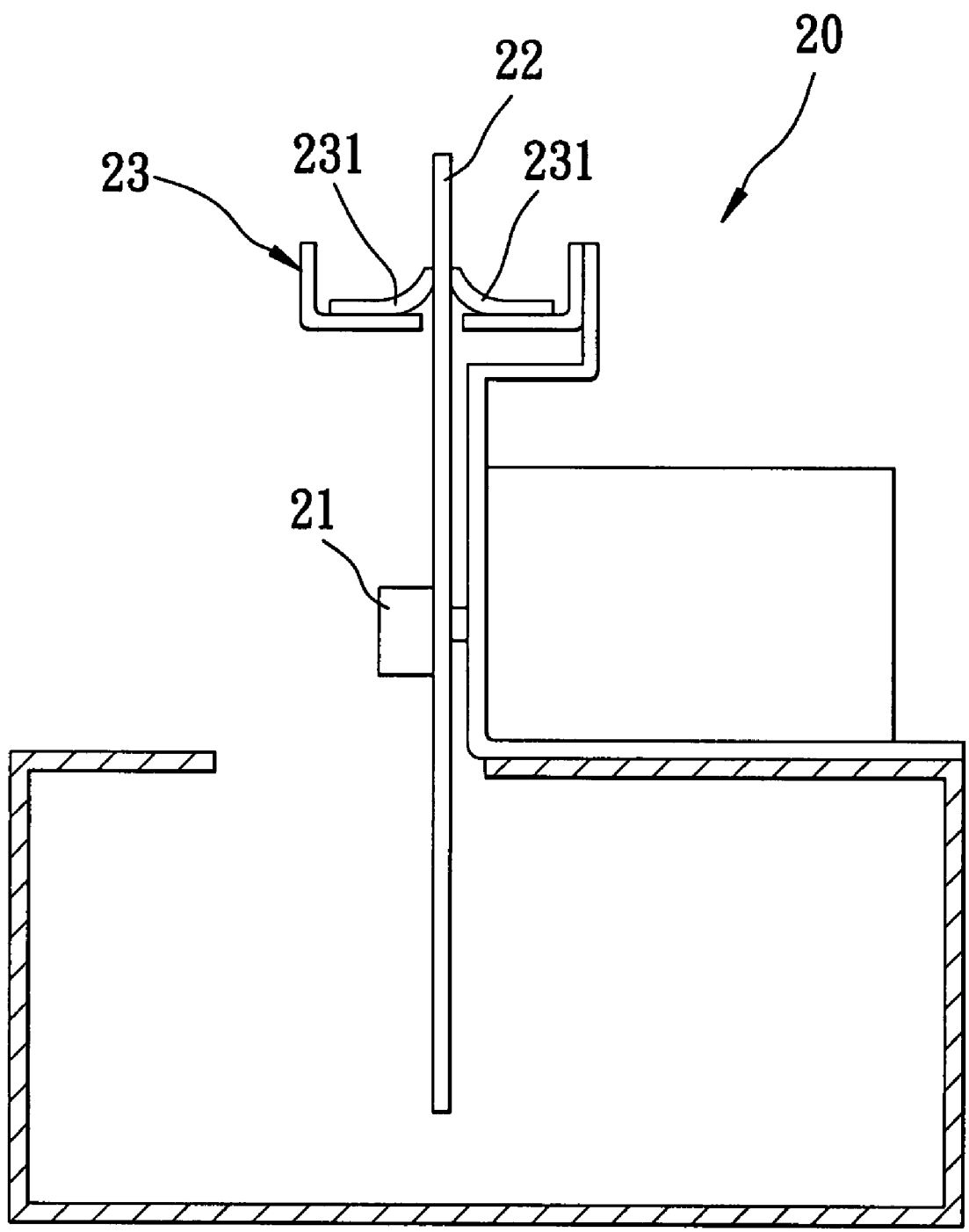
FIG. 3 is another schematic view of the conventional oil extracting apparatus of FIG. 2, illustrating a pair of oil scraping plates to scrape oil from the round plate.
Figure 4:
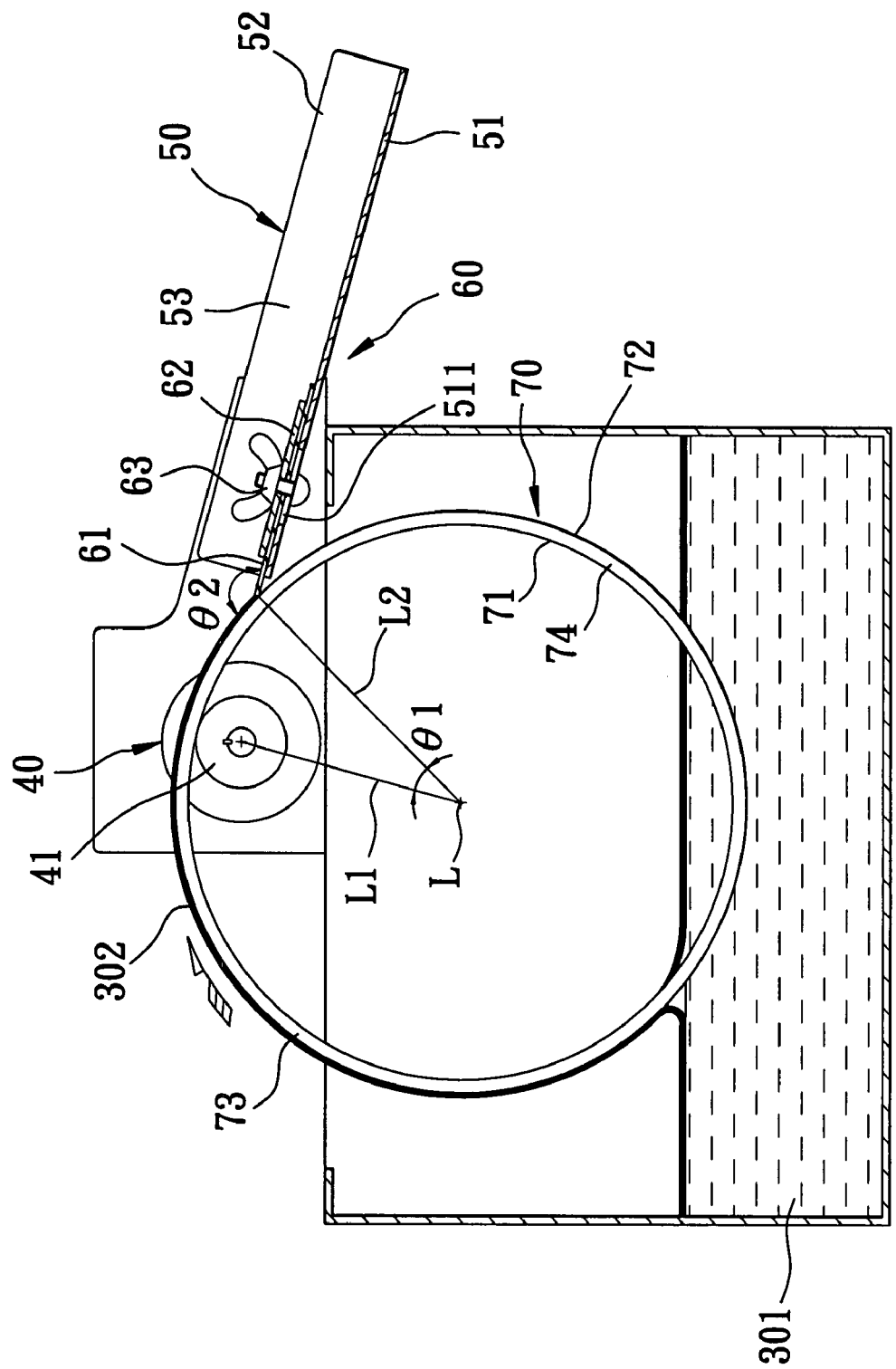
FIG. 4 is a partly sectional schematic view of a preferred embodiment of an oil extracting apparatus according to the invention.
Figure 5:
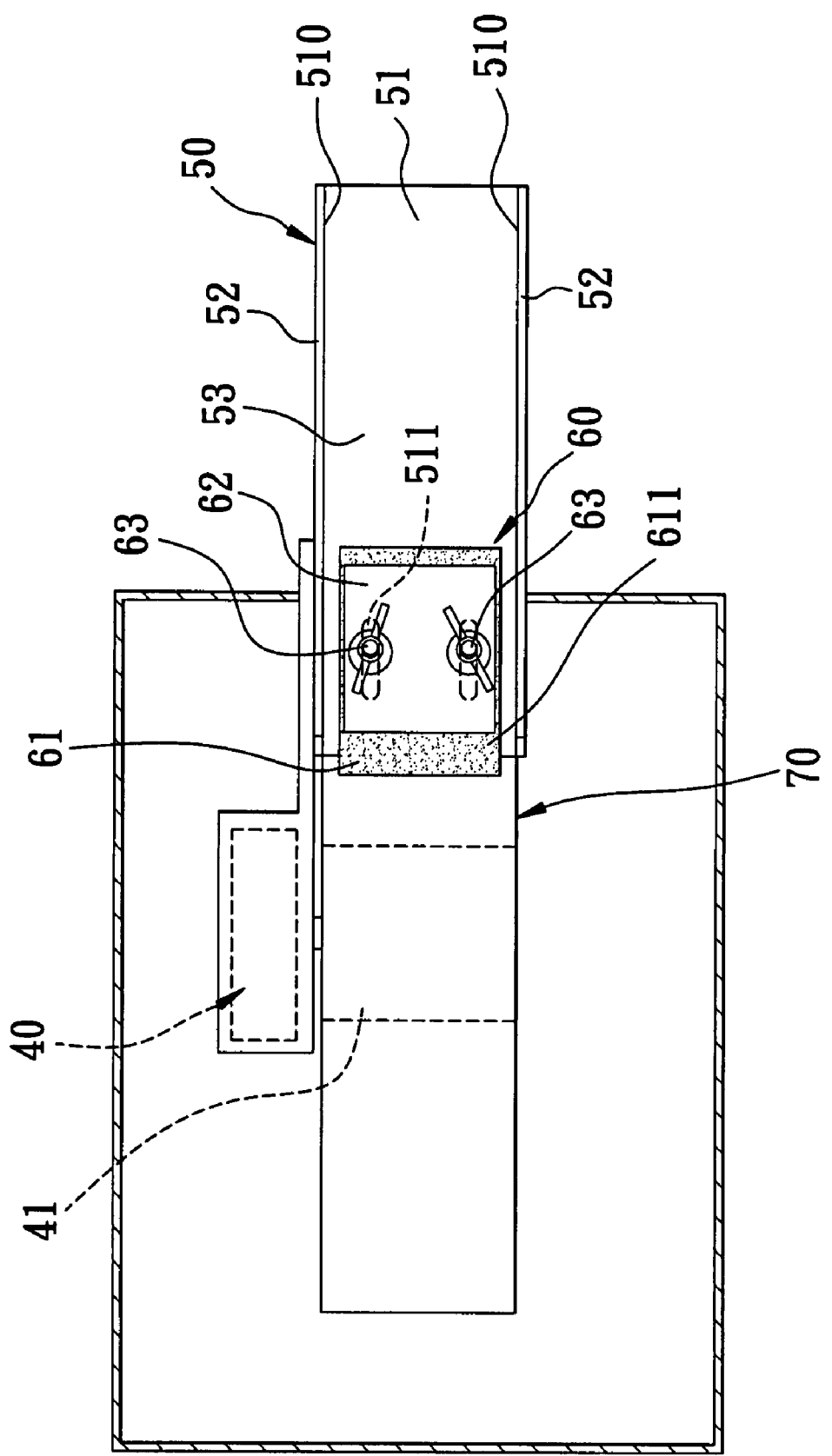
FIG. 5 is a schematic top view of the preferred embodiment.

As shown in FIGS. 4 and 5, the preferred embodiment of an oil extracting apparatus for removing oil from a water body 301 according to the present invention comprises a rigid oil adhering ring 70, a driving device 40, an oil scraping unit 60, and an oil collecting unit 50. The oil adhering ring 70 has a horizontally disposed ring axis (L) and an oil adhering surface 72 surrounding the ring axis (L). At least a portion of the oil adhering ring 70 below the ring axis (L) is adapted to be immersed in the water body 301.

The oil adhering ring 70 further has a driven surface 71 opposite to the oil adhering surface 72 in radial directions relative to the ring axis (L). The oil adhering ring 70 is made from a relatively hard material, such as stainless steel. Preferably, the oil adhering ring 70 is formed by cutting a stainless steel pipe.

The driving device 40 includes a drive shaft 41 that engages the driven surface 71 of the oil adhering ring 70 at a position above the ring axis (L) for driving rotation of the oil adhering ring 70 about the ring axis (L). The oil adhering ring 70 has an upwardly moving side 73 and a downwardly moving side 74 relative to the ring axis (L), and the drive shaft 41 engages the driven surface 71 at the downwardly moving side 74 of the oil adhering ring 70.

The oil scraping unit 60 includes an oil scraping plate 61 that extends toward the drive shaft 41 and that is in contact with the oil adhering surface 72 of the oil adhering ring 70. The oil scraping plate 61 has a top side 611, and the driving device 40 drives rotation of the oil adhering ring 70 in a direction toward the top side 611 of the oil scraping plate 61.

The oil collecting unit 50 includes a base plate 51 having opposite lateral sides 510, and a pair of side plates 52 that extend uprightly and respectively from the lateral sides 510 of the base plate 51, and that cooperate with the base plate 51 to define an oil collecting groove 53 having an open end that opens toward the drive shaft 41. The oil scraping plate 61 of the oil scraping unit 60 is mounted on the base plate 51 such that the top side 611 of the oil scraping plate 61 faces upwardly. The oil scraping unit 60 further includes a press plate 62 disposed on the top side 611 of the oil scraping plate 61, and a plurality of screw fasteners 63 for fastening the press plate 62 and the oil scraping plate 61 to the base plate 51. In this embodiment, the base plate 51 is formed with a plurality of slots 511 that extend parallel to the oil collecting groove 53, and the screw fasteners 63 extend through the slots 511, respectively. By virtue of the screw fasteners 63 and the slots 511, the position of the oil scraping plate 61 relative to the oil adhering ring 70 is adjustable. Preferably, the oil scraping plate 61 is made from a plastic material, such as polytetrafluoroethylene (PTFE).

Rotation of the oil adhering ring 70 results in separation of the oil from the water body 301 and in adhering of the oil on the oil adhering ring 70 to form an oil film 302 on the oil adhering surface 72 of the oil adhering ring 70. The oil scraping unit 60 scrapes the oil film 302 from the oil adhering surface 72 of the oil adhering ring 70. The oil collecting unit 50 collects the oil scraped by the oil scraping unit 60 from the oil adhering surface 72 of the oil adhering ring 70.

In this embodiment, a first imaginary line (L1) extends from the ring axis (L) to a rotary axis of the drive shaft 41, and a second imaginary line (L2) extends from the ring axis (L) to a contact point between the oil scraping unit 60 and the oil adhering surface 72 of the oil adhering ring 70. The first and second imaginary lines (L1, L2) cooperate to form an angle ($\theta_1$) of less than 90 degrees therebetween. By virtue of the positional relation among the oil adhering ring 70, the drive shaft 41 and the oil scraping plate 61, the oil adhering ring 70 will tend to lean toward the oil scraping unit 60 to abut firmly against the oil scraping plate 61 by the effect of gravity. In addition, an included angle ($\theta_2$) formed between the top side 611 of the oil scraping plate 61 and the oil adhering surface 72 is not smaller than 90 degrees, thereby resulting in a smoother and more effective oil scraping action. Moreover, the drive shaft 41 of the driving unit 40 can be designed to be in friction engagement or to mesh with the driven surface 72 of the oil adhering ring 70 for a more effective driving effect therebetween.

Compared to the flexible steel belt 12 of the conventional oil extracting apparatus 10, the oil adhering ring 70 of the preferred embodiment made from a relatively hard material is more durable. Moreover, the design of the oil adhering ring 70 results in a smaller lateral moment and torque about the drive shaft 41 of the driving unit 40 when the oil scraping unit 60 scrapes the oil film 302 from the oil adhering ring 70, thereby resulting in a longer service life than the conventional oil extracting apparatus 20.

In addition, the oil adhering ring 70 is coupled to the drive shaft 41 of the driving unit 40 at the periphery instead of the center thereof, which means that the applicable distance, i.e., the distance between the water level of the water body 301 and the drive shaft 41, is longer than that of the conventional oil extracting apparatus 20. Therefore, the preferred embodiment is more practical. In another aspect, since the oil adhering ring 70 of the preferred embodiment is more practical, the size of the oil adhering ring 70 can be made smaller than that of the round plate 22 of the conventional oil extracting apparatus 20, i.e., the size of the preferred embodiment is smaller than the conventional oil extracting apparatus 20.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An oil extracting apparatus for removing oil from a water body, said oil extracting apparatus comprising:
    a rigid oil adhering ring having a horizontally disposed ring axis and an oil adhering surface surrounding the ring axis, at least a portion of said oil adhering ring below the ring axis being adapted to be immersed in the water body;
    a driving device coupled to said oil adhering ring for driving rotation of said oil adhering ring about the ring axis, wherein rotation of said oil adhering ring results in separation of the oil from the water body and in adhering of the oil on said oil adhering ring to form an oil film on said oil adhering surface of said oil adhering ring;
    an oil scraping unit for scraping the oil film from said oil adhering surface of said oil adhering ring; and
    an oil collecting unit for collecting the oil scraped by said oil scraping unit from said oil adhering surface of said oil adhering ring;
    wherein said oil adhering ring further has a driven surface opposite to said oil adhering surface in radial directions relative to the ring axis, and said driving device includes a drive shaft that engages said driven surface of said oil adhering ring for driving rotation of said oil adhering ring about the ring axis; and
    wherein said drive shaft is in friction engagement with said driven surface of said oil adhering ring.

2. An oil extracting apparatus for removing oil from a water body, said oil extracting apparatus comprising:
    a rigid oil adhering ring having a horizontally disposed ring axis and an oil adhering surface surrounding the ring axis, at least a portion of said oil adhering ring below the ring axis being adapted to be immersed in the water body;
    a driving device coupled to said oil adhering ring for driving rotation of said oil adhering ring about the ring axis, wherein rotation of said oil adhering ring results in separation of the oil from the water body and in adhering of the oil on said oil adhering ring to form an oil film on said oil adhering surface of said oil adhering ring;
    an oil scraping unit for scraping the oil film from said oil adhering surface of said oil adhering ring; and
    an oil collecting unit for collecting the oil scraped by said oil scraping unit from said oil adhering surface of said oil adhering ring;
    wherein said oil adhering ring further has a driven surface opposite to said oil adhering surface in radial directions relative to the ring axis, and said driving device includes a drive shaft that engages said driven surface of said oil adhering ring for driving rotation of said oil adhering ring about the ring axis; and
    wherein said drive shaft engages said driven surface of said oil adhering ring at a position above the ring axis.

3. The oil extracting apparatus as claimed in claim 2, wherein said oil adhering ring has an upwardly moving side and a downwardly moving side relative to the ring axis, said drive shaft engaging said driven surface at said downwardly moving side of said oil adhering ring.

4. An oil extracting apparatus for removing oil from a water body, said oil extracting apparatus comprising:
    a rigid oil adhering ring having a horizontally disposed ring axis and an oil adhering surface surrounding the ring axis, at least a portion of said oil adhering ring below the ring axis being adapted to be immersed in the water body;
    a driving device coupled to said oil adhering ring for driving rotation of said oil adhering ring about the ring axis, wherein rotation of said oil adhering ring results in separation of the oil from the water body and in adhering of the oil on said oil adhering ring to form an oil film on said oil adhering surface of said oil adhering ring;

an oil scraping unit for scraping the oil film from said oil adhering surface of said oil adhering ring; and an oil collecting unit for collecting the oil scraped by said oil scraping unit from said oil adhering surface of said oil adhering ring;

wherein said oil adhering ring further has a driven surface opposite to said oil adhering surface in radial directions relative to the ring axis, and said driving device includes a drive shaft that engages said driven surface of said oil adhering ring for driving rotation of said oil adhering ring about the ring axis; and wherein a first imaginary line extends from the ring axis to a rotary axis of said drive shaft, a second imaginary line extends from the ring axis to a contact point between said oil scraping unit and said oil adhering surface of said oil adhering ring, and the first and second imaginary lines form an angle of less than 90 degrees therebetween.

5. An oil extracting apparatus for removing oil from a water body, said oil extracting apparatus comprising:

a rigid oil adhering ring having a horizontally disposed ring axis and an oil adhering surface surrounding the ring axis, at least a portion of said oil adhering ring below the ring axis being adapted to be immersed in the water body;

a driving device coupled to said oil adhering ring for driving rotation of said oil adhering ring about the ring axis, wherein rotation of said oil adhering ring results in separation of the oil from the water body and in adhering of the oil on said oil adhering ring to form an oil film on said oil adhering surface of said oil adhering ring;

an oil scraping unit for scraping the oil film from said oil adhering surface of said oil adhering ring; and an oil collecting unit for collecting the oil scraped by said oil scraping unit from said oil adhering surface of said oil adhering ring;

wherein said driving device includes a drive shaft that engages said oil adhering ring for driving rotation of said oil adhering ring about the ring axis, and said oil scraping unit includes an oil scraping plate that extends toward said drive shaft and that is in contact with said oil adhering surface of said oil adhering ring; and wherein said oil adhering ring has an upwardly moving side and a downwardly moving side relative to the ring axis, said drive shaft engaging said oil adhering ring and said oil scraping plate contacting said oil adhering ring at said downwardly moving side above the ring axis, said drive shaft being located higher than said oil scraping plate relative to the ring axis.

* * * * *